US012188418B2

(12) United States Patent
Crowe et al.

(10) Patent No.: US 12,188,418 B2
(45) Date of Patent: *Jan. 7, 2025

(54) SYSTEM FOR CONTROLLING A TURBINE

(71) Applicant: Signal Power Group Operating LLC, Oro Valley, AZ (US)

(72) Inventors: David Keith Crowe, Tucson, AZ (US); Elden W. Crom, Tucson, AZ (US)

(73) Assignee: Signal Power Group Operating LLC, Oro Valley, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,302

(22) Filed: Nov. 17, 2023

(65) Prior Publication Data

US 2024/0084739 A1 Mar. 14, 2024

Related U.S. Application Data

(63) Continuation of application No. 17/967,858, filed on Oct. 17, 2022, now Pat. No. 11,859,562, which is a continuation of application No. 17/485,394, filed on Sep. 25, 2021, now Pat. No. 11,499,484.

(60) Provisional application No. 63/083,378, filed on Sep. 25, 2020, provisional application No. 63/056,951, filed on Jul. 27, 2020.

(51) Int. Cl.
*F02C 9/00* (2006.01)
*G05B 15/02* (2006.01)

(52) U.S. Cl.
CPC ............... *F02C 9/00* (2013.01); *G05B 15/02* (2013.01); *F05D 2270/706* (2013.01)

(58) Field of Classification Search
CPC ..... F02C 9/00; F02C 6/00; F02C 9/28; G05B 15/02; F05D 2270/706
See application file for complete search history.

(56) References Cited

U.S. PATENT DOCUMENTS

| | | | | |
|---|---|---|---|---|
| 3,939,328 A | * | 2/1976 | Davis | F01K 13/02 |
| | | | | 290/40 R |
| 4,267,458 A | * | 5/1981 | Uram | G06K 13/0825 |
| | | | | 290/40 R |
| 5,121,604 A | * | 6/1992 | Berger | F02B 37/18 |
| | | | | 60/602 |
| 6,420,795 B1 | * | 7/2002 | Mikhail | H02P 9/007 |
| | | | | 290/55 |

(Continued)

OTHER PUBLICATIONS

Non-Final Office Action dated Mar. 11, 2022 in U.S. Appl. No. 17/485,394.

(Continued)

*Primary Examiner* — Ziaul Karim
(74) *Attorney, Agent, or Firm* — Snell & Wilmer L.L.P.

(57) ABSTRACT

A system for controlling a turbine is disclosed. The system includes a turbine control fuel governor that has a plurality of VCPIDs operating in parallel with one another. Each VCPID is associated with a respective turbine parameter and one or more external parameters. Each VCPID incorporates feedback from the parallel operating VCPIDs to feed an integral term of a current VCPID in the following manner: a previous derivative gain and a previous proportional gain are summed and subtracted from a selected output for the turbine to yield a result, and the result is input to an integral gain portion of the current VCPID.

21 Claims, 4 Drawing Sheets

Variable Coefficient Proportional-Integrative-Derivative (VCPID)

(56) References Cited

U.S. PATENT DOCUMENTS

| | | | | |
|---|---|---|---|---|
| 7,476,987 B2 * | 1/2009 | Chang | ...................... | H02J 3/32 |
| | | | | 290/55 |
| 7,939,961 B1 * | 5/2011 | Bonnet | ................ | F03D 7/0204 |
| | | | | 290/55 |
| 9,688,414 B2 * | 6/2017 | Burns | .................... | G05D 23/00 |
| 10,116,135 B1 * | 10/2018 | Shapiro | .................... | H02J 3/12 |
| 11,499,484 B2 | 10/2022 | Crowe et al. | | |
| 2004/0011052 A1 * | 1/2004 | Clements | ................ | F02C 9/263 |
| | | | | 60/773 |
| 2009/0005886 A1 * | 1/2009 | Gao | ...................... | G05B 13/02 |
| | | | | 700/29 |
| 2010/0038907 A1 * | 2/2010 | Hunt | .................. | E21B 41/0085 |
| | | | | 290/43 |

OTHER PUBLICATIONS

Notice of Allowance dated Jul. 20, 2022 in U.S. Appl. No. 17/485,394.
Notice of Allowance dated Aug. 24, 2023 in U.S. Appl. No. 17/967,858.

* cited by examiner

SYSTEM FOR CONTROLLING A TURBINE

CROSS-REFERENCE TO RELATED APPLICATIONS

This application is a continuation of U.S. patent application Ser. No. 17/967,858 filed on Oct. 17, 2022 entitled "SYSTEM FOR CONTROLLING A TURBINE". U.S. patent application Ser. No. 17/967,858 is a continuation of U.S. patent application Ser. No. 17/485,394 filed on Sep. 25, 2021 entitled "SYSTEM FOR CONTROLLING A TURBINE," now U.S. Pat. No. 11,499,484 issued on Nov. 15, 2022, which claims priority to, and the benefit of, U.S. Provisional Patent Application Ser. No. 63/056,951, filed Jul. 27, 2020 entitled "ADAPTIVE TURBINE DIGITAL ENGINE CONTROL," and U.S. Provisional Patent Application Ser. No. 63/083,378, filed Sep. 25, 2020 entitled "PRESSURE CONTROLLED FRACKING." The content of each these aforementioned patent applications is herein incorporated by reference.

BACKGROUND OF THE INVENTION

The present invention relates to turbines and, more particularly, to a system and method of controlling a turbine for hydraulic fracturing using an Adaptive Turbine Digital Engine Control ("ATDEC") that can be configured to adapt to varying inputs external to the turbine and utilize these to govern fuel. With current technology, the turbine engine control is limited to control fuel based on turbine components and sensors. The fuel governor is not able, or adaptive, enough to control fuel that is influenced by external stimulus. The intent of this invention is to have all critical components on the frac pump directly influence the fuel governor and therefore control the fuel. In addition, the external sensors, like well pressure, will also govern fuel demand of the turbine. From a very high level, the ATDEC will analyze all inputs that govern fuel and choose the one that demands the least amount of fuel (i.e., "Min Select" 9).

In fracking a well, the pressure of the water going down hole must be limited to ensure that the well casing is not ruptured. In existing systems, the operator of the pumps notices that the pressure is rising at the well head and reduces the pumping rate, barrels per minute. This is a manual process that is sometimes implemented too late, or too early, or to the wrong degree. Current systems have only a hard shutdown if the pressure is exceeded, if this occurs it slows the operation at a minimum and if all the pumps trip at the same time, the entire well might become compromised by "sanding out".

For additional background: fracking, hydraulic fracturing, is the process for improving the performance of oil and natural gas wells. It uses high pressure fluids to make fissures in rock (usually shale) to allow more mined fluid to flow more freely. In the course of performing this well completion operation, a high horsepower pump in operated. Starting said pump is often preformed when the well pressure is substantially high, often 60% or higher than the operating pressure ranging from 4 to 9 thousand psi in the Permian Basin. The fluids used often include expensive and can cause ground water contamination if deposited in the water table. A breakage of the well casing within the range of the water table is unacceptable. To prevent this expensive problem from arising, the well is assigned a pressure rating and said pressure is to be avoided. In state-of-the-art operation of today, a human operator is often limiting the rate that the fluid is introduced into the well. For a fixed flow rate, the pressure of the well will usually rise as more and more fluid is pushed in. The operator noticing this rise will reduce the rate that the fluid is pushed into the well head. Usually this is a slow operation occurring over the course of a few minutes and is readily handled by an attentive operator. Occasionally, this pressure rise can occur within a handful of seconds. Other systems simply hold throttle but do not continually compensate for increasing pressure. This requires human intervention to reduce the throttle in order to compensate for the increasing pressure.

FIG. 1 illustrates an exemplary conventional fuel governor for a gas turbine engine used on the Chinook helicopter. This control scheme is based on the computation of a parameter referred to as NDOT (*). (NDOT is directly proportional to the fuel command which controls fuel flow). This closed loop fuel governor operates as a single NDOT fuel governor 1 and time filter to manage multiple input setpoints. This governor controls the operation of the turbine to the given set points via a fuel control valve (FCV) command (CMD). For this type of control, a classic PID loop is employed, which is also the main limitation of these systems. By utilizing one PID loop, controlling the turbine fuel by an external parameter is not as accurate and leads to less efficient operations. This governor 1 needs to calculate the amount of fuel needed to ensure none of the operational setpoints are exceeded. This type of control is most accurate when controlling the setpoint (abbreviated as "Set" in the drawings) that is more physically connected to the combustion of fuel as that is what the FCV command controls. For the T55, N1 refers to the core engine speed and therefore fuel efficiency is the highest when N1 is the controlling setpoint (the setpoint selected by Min Select). The same principle applies to a second turbine sensor N2 and the turbine temperature EGT but given that there is only on PID utilized, the efficiency is less when these setpoints are selected by Min Select. This control theory is not accurate enough to control setpoints that are detached from the engine and indirectly affected by the gas turbine.

As can be seen, there is a need for an improved digital engine control the provides an automated system that is quicker to respond and very vigilant.

SUMMARY OF THE INVENTION

In one aspect of the present invention, a system for controlling a turbine comprises: a turbine control fuel governor comprising a plurality of VCPID control loops operating in parallel with one another, each VCPID control loop being associated with a respective turbine parameter and one or more external parameters, wherein each VCPID control loop incorporates feedback from the parallel operating VCPID control loops to feed an integral term of a current VCPID in the following manner: a previous derivative gain and a previous proportional gain are summed and subtracted from a selected output for the turbine to yield a result, and the result is input to an integral gain portion of the current VCPID.

These and other features, aspects and advantages of the present invention will become better understood with reference to the following drawings, description and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
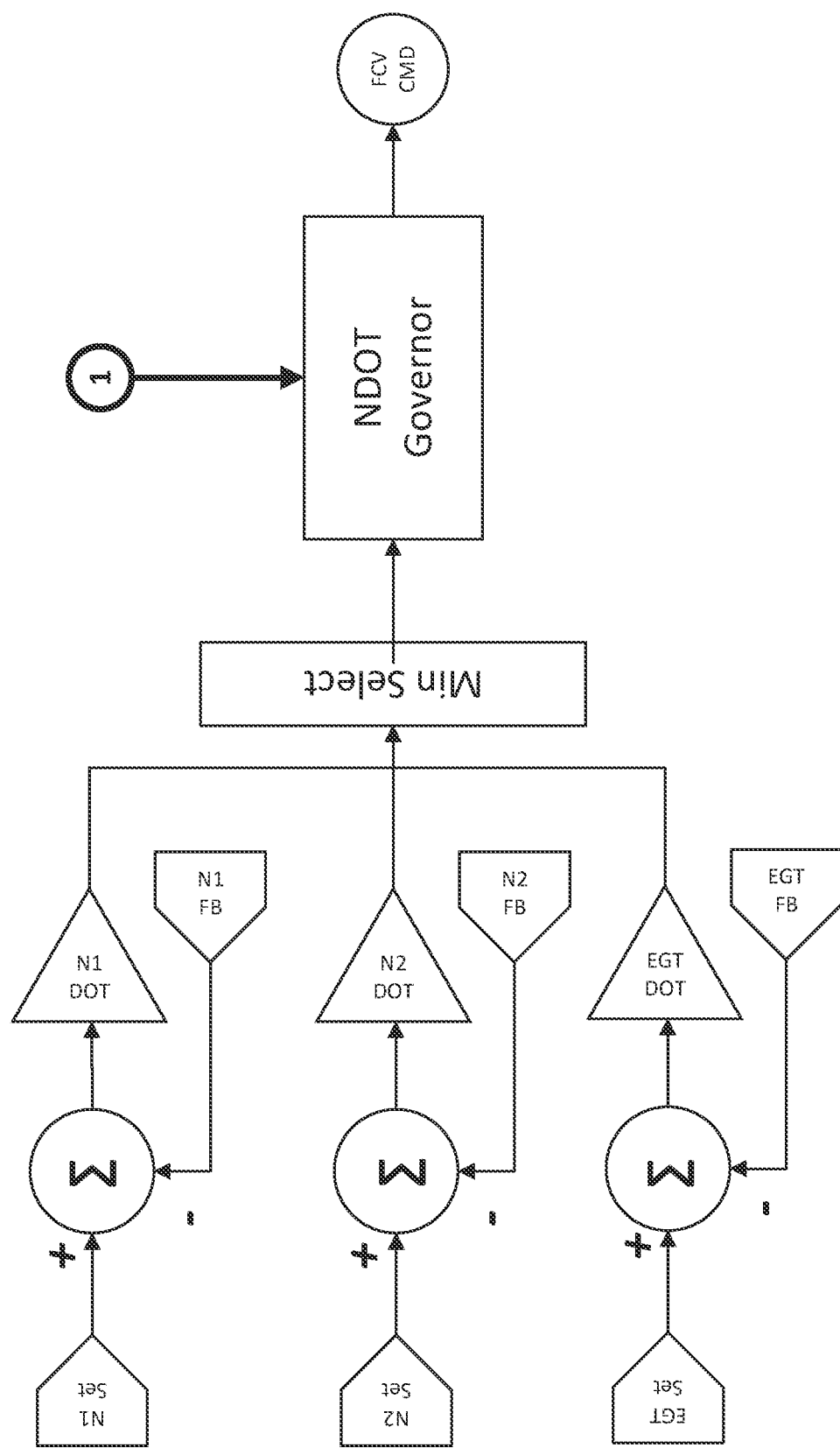
FIG. 1 is a schematic view of a conventional system that runs with a single governor 1.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details.

Broadly, one embodiment of the present invention is at least one turbine engine controller implementing a hybrid fuel governor to control the amount of fuel delivered to a turbine every frame. A frame of time is usually between 5 ms and 20 ms where the controller predicts the amount of fuel needed to consume to maintain operating conditions. Typically, turbine engine controllers implement a closed loop PID controller that monitors turbine parameters and utilizes the PID mathematical formula to calculate the needed fuel per frame but uses only one PID as a fuel governor. The present invention will utilize a series of VCPIDs 4 to enable the ATDEC to monitor systems not directly connected to the turbine and control their setpoints by controlling the output power of the turbine to these external set points.

Figure 4:
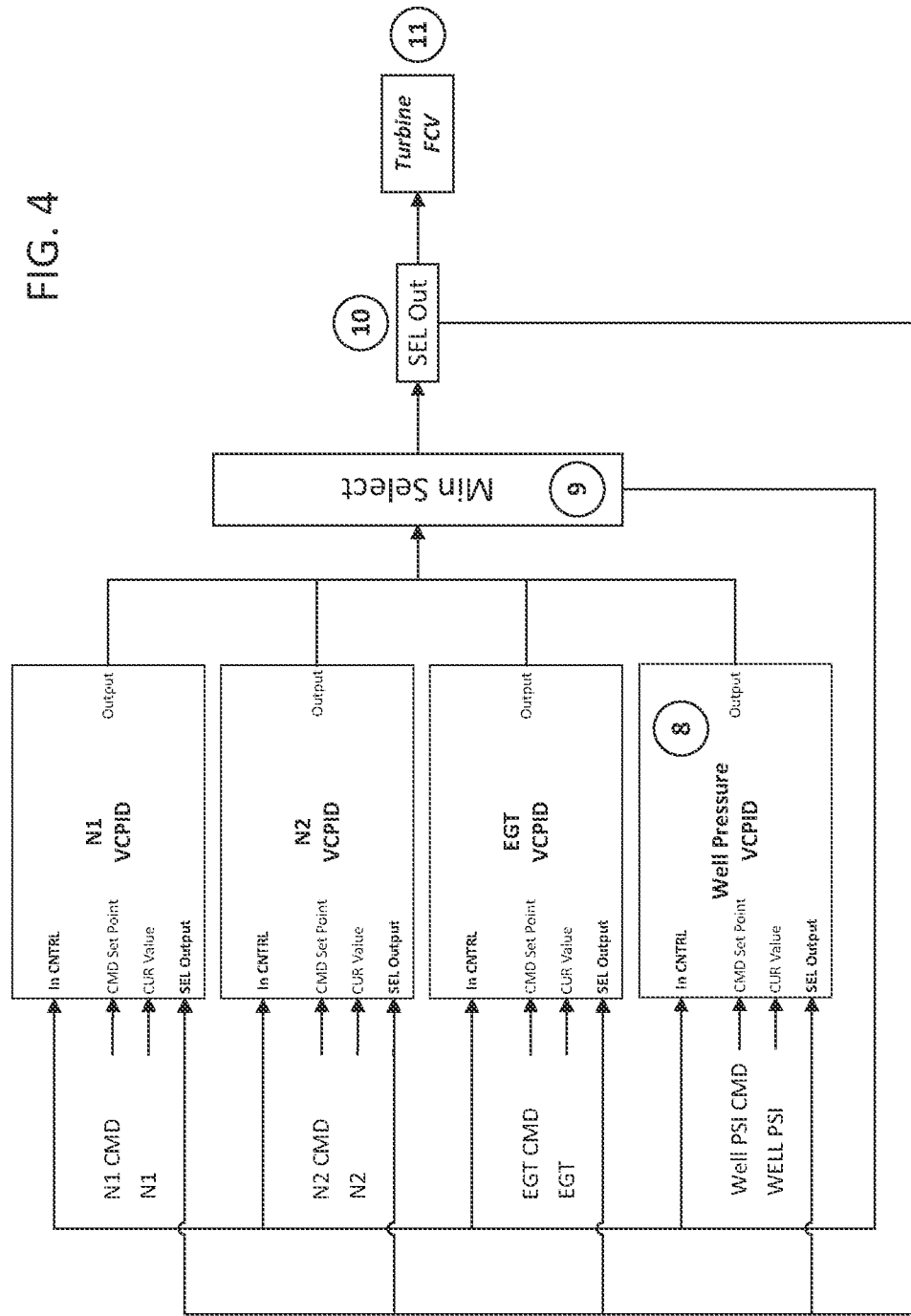
FIG. 4 is a schematic view of the embodiment of the present invention, depicting the addition of an external control/sensor 8 operating with the parallel independent governors. Min Select 9 serves two functions, it selected the minimum fuel demand from the VCPID and feeds this back 10 along with an indication of which VCPID is in control 9.

In general, and in accordance with the present invention, a VCPID 4 adds two new feedback inputs to a standard PID calculation: $SEL_{output}$ 2 and In CNTRL 3, that allows multiple VCPIDs 4 to work together, or in parallel. FIG. 4 depicts the two feedback mechanisms 9 and 10 that drive the modified PID loop FIG. 2 inputs 2 and 3. In CNTRL 3 switches the standard PID loop between modified operation and standard operation. When TRUE 3, the PID calculations in FIG. 2 default to normal operations. When FALSE 3, the PID calculations utilize the last OUTPUT from Min Select 9 and feed that value 10 through the calculations defined in 2. This moves the integral portion of the PID loop to the last output from the in control VCPID 4 and calculates the fuel demand for the next frame. This feedback allows for a smooth handover between VCPIDs, of which one is in control 3.

To take advantage of the ATDEC invention, adding an external VCPID, like well pressure 8, enables the ATDEC to monitor the well pressure and automatically adjusts turbine output based on a purely external stimulus allowing for a quicker response. Being an automated system to perform the rate reducing ensures the safety of the well casing, even if the operator is distracted. This fast automatic response allows running a higher rate and higher pressures closer to the limits since any sudden increase in pressure can be detected and mitigation actions taken within milliseconds, instead of the operator response time of a few seconds.

The present invention allows for a turbine control that can take over tasks typically done by operators or other control systems, providing for faster response times, smoother operations, higher reliability, and finer control than a human operator. Human operators have limited response times and can become distracted when working a highly repetitive operations for hours on end. An automated system ties to the heart of the turbine control system is more reliable at tedious operations, and quicker to respond.

Figure 3:
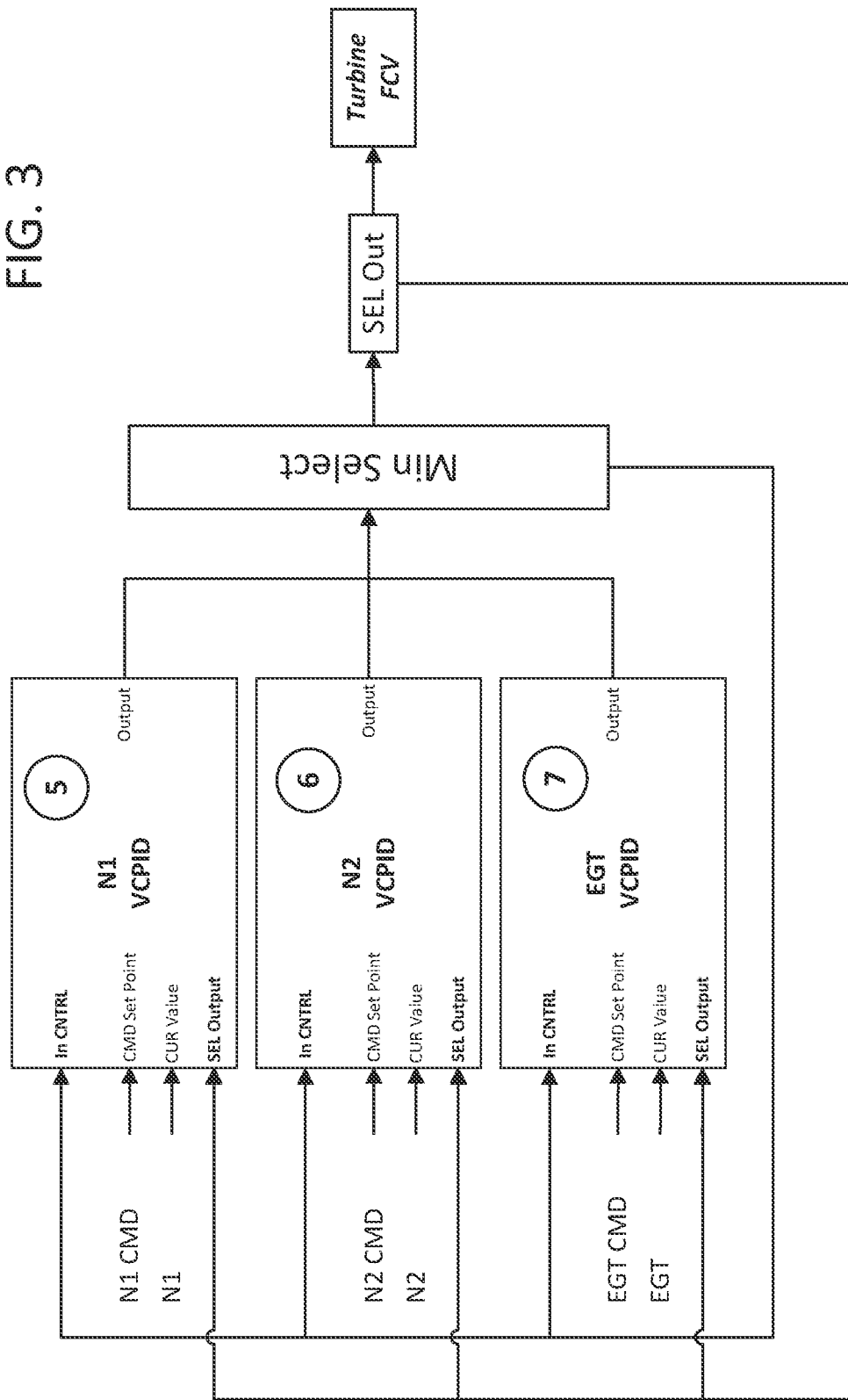
FIG. 3 is a schematic view of a modified conventional control 1 implemented with the upgraded VCPID 4, similar to FIG. 1, but with the SEL Out and In CNTRL modifications, upgrading it to use of three independent governors, in accordance with the present invention, as opposed to a single governor 1.

Certain embodiments of the present invention may include an ATDEC configured as depicted in FIG. 3 that will operate more efficiently than an older system as depicted in FIG. 1.

Certain embodiments of the present invention may include an ATDEC configured as depicted in FIG. 4 that will operate more efficiently than an older system as depicted in FIG. 1 and protect the external well.

Certain embodiments of the present invention may include an ATDEC configured as depicted in FIG. 4 but with the addition of VCPIDs 4 that monitor pump sensors (oil temp, torque) and transmission sensors (oil temp, torque) to provide a fully integrated ATDEC.

Certain embodiments of the present invention include a fracking pump control system such that the operator inputs both the rate and the pressure limits and the control system limits the power applied by the pump to stay within those limits and any other pre-programmed limits as indicated by expanded VCPIDs.

In general, a closed loop pump controller first receives a pressure setpoint from a user (via an input device, such as a graphical user interface). This is shown, for example, in FIG. 4, which illustrates a Well PSI CMD, which is set via user input. Next, the ATDEC is connected to a hardware input (e.g., WELL PSI in FIG. 4) to read an analog signal. Third, the pump controller translates the user setpoint to analog scale. Once setup, adjustments are made in the fuel governor at the same rate the governor is governing turbine speed and temperature. By executing at the fuel governor level, the most efficient operation of the engine can be achieved. This is depicted in FIG. 4, where the Well Pressure VCPID is running in parallel to the N1, N2, and EGT VCPIDs. All of the parallel VCPIDs are connected to two feedbacks from the output of the system. Min Select 9 sets the state of whether a VCPID was the lowest demand for fuel the last time the control loop executed. SEL Out 10 is connected to the input SEL Output 2 which will be used to calculate the new fuel command for all VCPIDs that were not in control 3.

Before or during operation, the user inputs the rate and pressure limits, which are generally a few percentage points below the allowable limits. The well head pressure transducer is constantly monitored by the control software for, if and when the pressure approaches and/or exceeds said pressure limit, reducing the pumping rate.

Figure 2:
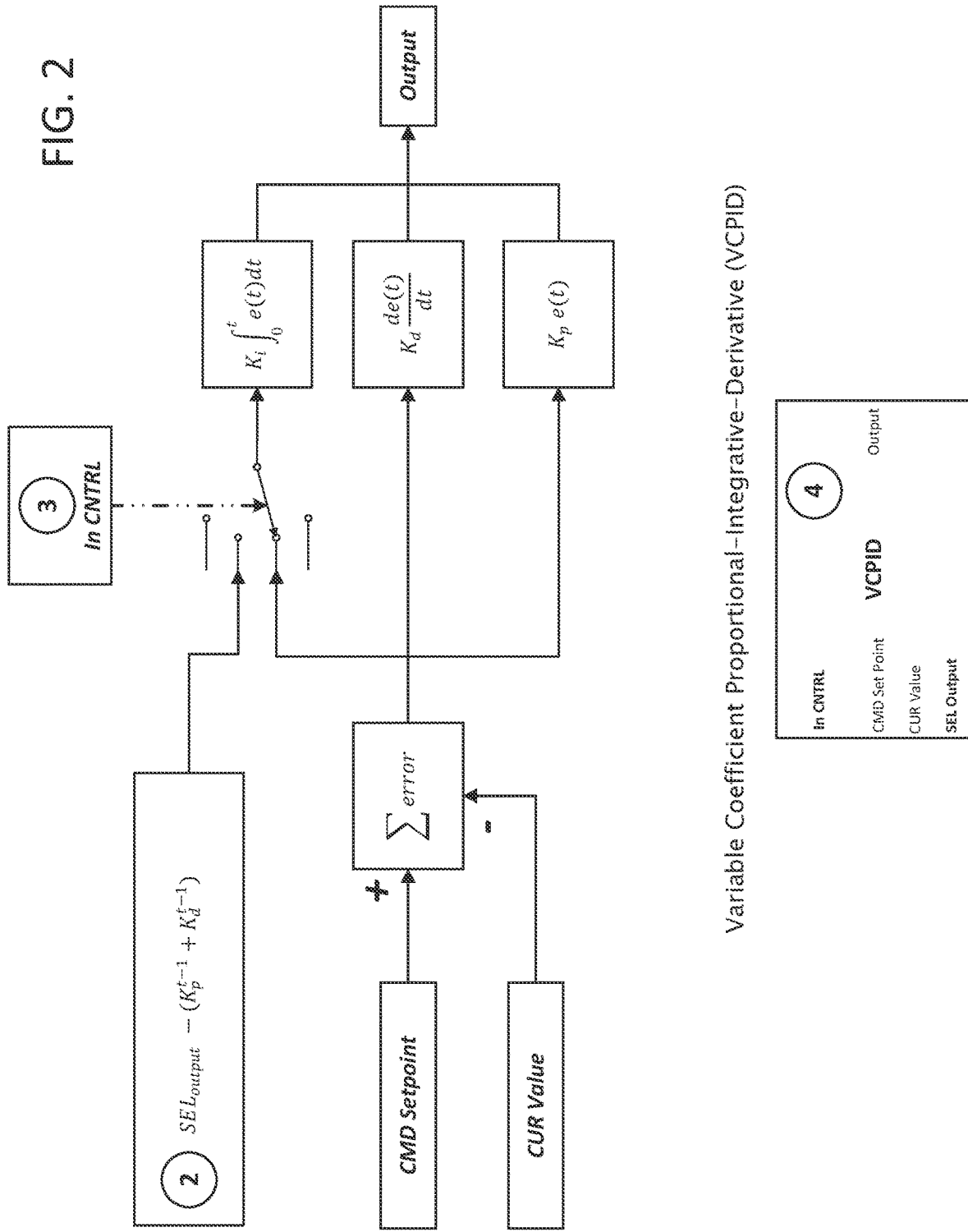
FIG. 2 is a mathematical schematic view of an embodiment of the present invention, depicting how a governor of the present invention introduces a feedback for the integral term 2 and an input In CNTRL 3 used to turn the modification on and off based on if it is the controlling proportional-integrative-derivative (PID) control loop. This modification is called the Variable Coefficient Proportional Integrative Derivative ("VCPID") (also synonymous with VCPID control loop) as the VCPID utilizes a variable coefficient based on feedback from parallel VCPIDs.

FIG. 2 depicts, mathematically, how the governor (referred to herein as a VCPID) of the present invention is different so that an ATDEC with a fuel governor controlling fuel based on an external hardware analog input 8 (as mentioned above) is possible. As discussed in the Background, the governor 1 in FIG. 1 contains a classical PID loop, but this type of loop does not allow for multiple PID calculations in parallel. In comparison, the adapted PID loop in FIG. 2 defines the modifications to a PID loop that incorporates information from the PID loop in control. This adapted PID loop is referred to herein as a VCPID 4.

The VCPID contains two feedback points so that an external VCPID can initialize it to a current state. The first feedback point is $SEL_{output}$ 2, which is the output of an external VCPID that is currently in control of the fuel for the last time frame. $SEL_{output}$ 2 uses an external VCPID integral term as current input when another VCPID is being used. The integral term in the VCPID will utilize the current 'in charge' VCPID leading to a seamless switch between VCPIDs. In doing so, independent governors can be tuned to very accurate performances on their own create a more efficient system. The second feedback point is "In CNTRL" 3, which indicates if this VCPID is currently in control or not (i.e., whether the VCPID is controlling or utilizing an external state).

In this modification to the standard PID, if this PID is NOT in control, it will initialize the integral portion of the calculation with the output of an external PID running in parallel and subtracts the previous internal derivative and proportional terms. The VCPID 4 has the following inputs: In CNTRL 3, CMD Set Point (which is the value this governor 4 should control to), and CUR Value (which is the current value that should be driven to the set point).

FIG. 3 illustrates standard turbine setup with no external sensor, but with the ability to incorporate it, since there are now three independent governors (VCPIDs 5, 6, 7) as opposed to FIG. 1, with only one governor 1. Accordingly, FIG. 3 is similar to FIG. 1, the original control, but updated to use the new VCPID 4. The new implementation of the simple turbine control implements, for example, three VCPIDs 4 bound to the same variables as that of FIG. 1. An N1 VCPID 5 controls fuel against N1 set points and N1 speed, an N2 VCPID 6 controls fuel against N2 set points and N2 speed, and an EGT VCPID 7 controls fuel against turbine exhaust temperature set points. This modified application of the VCPID 4 is more fuel efficient, given that the fuel can be tuned to each parameter independently.

FIG. 4 shows the addition of an external sensor working with parallel VCPIDS. The new VCPID allows for external control of fuel by sources that can be affected by external factors (i.e., an external parameter) other than just the turbine. By having independent VCPIDs, the turbine can be integrated into complex systems that have external forces affecting them. A Well Pressure VCPID 8 implements a VCPID, as described above, against well pressure that is affected by other pumps in the system. Without explicit coordination, each direct drive turbine pump utilizing the teachings of this disclosure will monitor the effects of the other pumps on well pressure and predict fuel based on that observation. In this example, a well pressure on a frac site can control the fuel and be tuned even though the well pressure is a product of rock formations, other pumps, and other factors. Those with skill in the art will appreciate that the VCPID can also be applied to other system critical sensors like torque and oil temperature. This will create a truly 'smart turbine control' that does not simply look at turbine operational parameters, but instead all operational parameters in an integrated system.

To make various embodiments of the present invention, these algorithmic software embodiments utilize industrial standard components such as pressure transducers and digital engine controllers, which reduces the complexity of implementing the present invention. At least one of each head pressure transducer, an engine controller connected to a fracking pump are required. Multiple pressure transducers could also be placed at various points in the frack pluming (often referred to as "the iron") which would serve to not only protect the well head, but also the pump, the missile, it's valves and other elements of the iron.

In use, most commonly, the operator would enter the rate and pressure limits into the system. The pressure limit will usually be set to the well casing pressure, but other limiting factors in the iron maybe considered and input into this limit. The operator will start up the pumps and command the rate as needed for the frack job. As the fracking operation continues, commonly, the pressure will rise. If and when the pressure gets to the inputted limit, the engine will begin to limit its power to prevent the pressure form rising above the pressure limit. Additional uses include water transfer (e.g., fluid pumps) and other pipeline systems that require monitoring/managing pressure, temperature, and other parameters for safety.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A system for controlling an engine, comprising:
 a fuel governor comprising a first VCPID (Variable Coefficient Proportional Integrative Derivative) control loop operating in parallel with a second VCPID control loop to regulate fuel flow to the engine, each VCPID control loop of the first VCPID control loop and the second VCPID control loop being associated with a respective engine parameter and one or more external parameter,
 an external transducer comprising a sensor for sensing an external parameter of the one or more external parameter,
 wherein the first VCPID control loop incorporates feedback from the second VCPID control loop to feed an integral term of the first VCPID control loop by steps comprising:
  (i) a previous derivative gain and a previous proportional gain are summed and subtracted from a selected output for the engine to yield a first result term,
  (ii) the first result term is input to an integral gain portion of the first VCPID control loop,
 wherein the each VCPID control loop of the first VCPID control loop and the second VCPID control loop includes a VCPID output that is fed to a first function,
 wherein the first function selects a fuel command based on the VCPID output, the fuel command being a command that requires a first amount of fuel to the second VCPID control loop, and
 wherein the fuel governor provides the first amount of fuel to the engine to regulate the fuel flow to the engine to maintain the external parameter sensed by the sensor at least one of (i) above a lower limit and (ii) below an upper limit.

2. The system of claim 1, wherein the external parameter is a well pressure generated by a pump attached to a petroleum well and driven by the engine.

3. The system of claim 1, wherein the external parameter is a parameter of a fluid pump providing fluid to a petroleum well by the engine.

4. The system of claim 1, wherein the engine is a turbine engine.

5. The system of claim 1, wherein the first function is a minimum select function.

6. The system of claim 1, wherein the first amount of fuel is a least amount of fuel to not exceed a setpoint.

7. The system of claim 1, wherein the regulating the fuel flow comprises varying a composition of a fuel, wherein the first amount of fuel comprises a selected composition of the fuel.

8. The system of claim 1, wherein one or more of the first VCPID control loop and the second VCPID control loop is connected to a core engine speed sensor sensing a core engine speed N1.

9. The system of claim 1, wherein the engine is a turbine engine and wherein one or more VCPID control loop is connected to a power turbine speed sensor sensing a power turbine speed N2.

10. The system of claim 1, wherein one or more of the first VCPID control loop and the second VCPID control loop is connected to an engine temperature sensor sensing an engine temperature.

11. The system of claim 1, wherein one or more of the first VCPID control loop and the second VCPID control loop is connected to an engine oil temperature sensor sensing an engine oil temperature.

12. The system of claim 1, wherein one or more of the first VCPID control loop and the second VCPID control loop is connected to a transmission oil temperature sensor sensing a transmission oil temperature of a transmission connected to the engine.

13. The system of claim 1, wherein one or more of the first VCPID control loop and the second VCPID control loop is connected to a pump oil temperature sensor sensing a pump oil temperature of a pump connected to the engine.

14. The system of claim 1, wherein one or more of the first VCPID control loop and the second VCPID control loop is connected to a torque sensor sensing a first torque.

15. The system of claim 14, wherein the first torque is an engine torque at the engine.

16. The system of claim 14, wherein the first torque is a pump torque at a pump driven by the engine.

17. The system of claim 14, wherein the first torque is a transmission torque at a transmission drive by the engine.

18. A system for controlling a prime mover, comprising:
 a governor comprising a first VCPID (Variable Coefficient Proportional Integrative Derivative) control loop to regulate an input energy source to the prime mover, the first VCPID control loop being associated with a prime mover parameter and an external parameter,
 an external transducer comprising a sensor for sensing the external parameter,
 wherein the first VCPID control loop incorporates feedback from a second VCPID control loop to feed an integral term of the first VCPID control loop by steps comprising:
  (i) a previous derivative gain and a previous proportional gain are summed and subtracted from a selected output for the prime mover to yield a first result term,
  (ii) the first result term is input to an integral gain portion of the first VCPID control loop,
 wherein the first VCPID control loop includes a VCPID output that is fed to a first function,
 wherein the first function selects an input energy command based on the VCPID output, the input energy command being a command that requires a first amount of input energy to the first VCPID control loop, and
 wherein the governor provides the first amount of input energy to the prime mover to regulate input energy flow to the prime mover to maintain the external parameter sensed by the sensor at least one of (i) above a lower limit and (ii) below an upper limit.

19. The system of claim 18, wherein the prime mover is a gas turbine engine,
 wherein the input energy source is a fuel source, and
 wherein the input energy is a fuel.

20. A method of controlling an engine, comprising:
 operating a fuel governor comprising a first VCPID (Variable Coefficient Proportional Integrative Derivative) control loop operating in parallel with a second VCPID control loop to regulate fuel flow to the engine, each VCPID control loop of the first VCPID control loop and the second VCPID control loop being associated with a respective engine parameter and one or more external parameter;

sensing, by an external transducer comprising a sensor, an external parameter of the one or more external parameter;

incorporating, by the first VCPID control loop, feedback from the second VCPID control loop to feed an integral term of the first VCPID control loop by steps comprising:
(i) a previous derivative gain and a previous proportional gain are summed and subtracted from a selected output for the engine to yield a first result term,
(ii) the first result term is input to an integral gain portion of the first VCPID control loop;

feeding, by the each VCPID control loop of the first VCPID control loop and the second VCPID control loop, a VCPID output that is fed to a first function;

selecting, by the first function, a fuel command based on the VCPID output, the fuel command being a command that requires a first amount of fuel to the second VCPID control loop; and providing, by the fuel governor, the first amount of fuel to the engine to regulate the fuel flow to the engine to maintain the external parameter sensed by the sensor at least one of (i) above a lower limit and (ii) below an upper limit.

21. The method of claim 20, further comprising driving a pump attached to a petroleum well by the engine, wherein the external parameter is a well pressure generated by the pump attached to the petroleum well and driven by the engine.

* * * * *